(12) United States Patent
Su

(10) Patent No.: US 12,160,641 B1
(45) Date of Patent: Dec. 3, 2024

(54) VERSATILE AUDIO AND VIDEO CONTENT PLAYBACK NAVIGATION SYSTEM AND PROCESSES FOR VERSATILE NAVIGATION OF AUDIO AND VIDEO CONTENT DURING PLAYBACK

(71) Applicant: Philip Ti-Fei Su, Mercer Island, WA (US)

(72) Inventor: Philip Ti-Fei Su, Mercer Island, WA (US)

( * ) Notice: Subject to any disclaimer, the term of this patent is extended or adjusted under 35 U.S.C. 154(b) by 0 days.

(21) Appl. No.: 18/634,551

(22) Filed: Apr. 12, 2024

Related U.S. Application Data

(60) Provisional application No. 63/459,535, filed on Apr. 14, 2023.

(51) Int. Cl.
*H04N 21/472* (2011.01)
(52) U.S. Cl.
CPC .............................. *H04N 21/47217* (2013.01)
(58) Field of Classification Search
None
See application file for complete search history.

(56) References Cited

U.S. PATENT DOCUMENTS

| | | | |
|---|---|---|---|
| 9,386,328 B1* | 7/2016 | Crane | H04N 21/858 |
| 9,596,502 B1* | 3/2017 | Abecassis | H04N 21/43074 |
| 10,095,367 B1* | 10/2018 | Berry | H04N 21/234363 |
| 10,747,408 B2* | 8/2020 | You | H04N 21/4532 |
| 2002/0180774 A1* | 12/2002 | Errico | G11B 27/34 |
| | | | 715/721 |
| 2012/0321281 A1* | 12/2012 | Hilem | H04N 9/8233 |
| | | | 386/E5.003 |
| 2013/0051754 A1* | 2/2013 | Gilpin | H04N 21/4756 |
| | | | 386/E9.011 |
| 2013/0129316 A1* | 5/2013 | Dontcheva | G11B 27/34 |
| | | | 386/E9.011 |
| 2014/0296675 A1* | 10/2014 | Freeman | A61B 5/0836 |
| | | | 600/364 |
| 2021/0110203 A1* | 4/2021 | Cope | G06V 10/774 |
| 2023/0199275 A1* | 6/2023 | Dhanwal | H04N 21/25833 |
| | | | 725/25 |
| 2024/0144797 A1* | 5/2024 | Brault | G08B 13/19693 |

* cited by examiner

*Primary Examiner* — Toan H Vu
(74) *Attorney, Agent, or Firm* — Plager Schack LLP; Mark H. Plager, Esq.; Stephen Hallberg, Esq.

(57) ABSTRACT

A versatile audio and video content playback navigation system and processes for versatile navigation of audio and video content during playback are disclosed which enable skipping, scanning (and getting snippets of audio while scanning), and swiping (past ads) through audio (e.g., podcast) and setting precision controlled skip and scan distance parameters. The versatile audio and video content playback navigation system and processes allow users to hear snippets of the audio being skipped, and also enables variably-proportionate amounts of audio to be skipped via a single interactive navigation tool, output as a button, so that users can be much more precise with how much audio and/or video to skip.

16 Claims, 8 Drawing Sheets

VERSATILE AUDIO AND VIDEO CONTENT PLAYBACK NAVIGATION SYSTEM AND PROCESSES FOR VERSATILE NAVIGATION OF AUDIO AND VIDEO CONTENT DURING PLAYBACK

CLAIM OF BENEFIT TO PRIOR APPLICATION

This application claims benefit to U.S. Provisional Patent Application 63/459,535, entitled "A MULTI-FUNCTIONAL INTERACTIVE AUDIO SYSTEM INTERFACE TOOL AND PROCESS FOR SKIPPING, SCANNING WITH AUDIO SNIPPET PLAYBACK, AND SWIPING THROUGH AUDIO STREAMS," filed Apr. 14, 2023. The U.S. Provisional Patent Application 63/459,535 is incorporated herein by reference.

BACKGROUND

Embodiments of the invention described in this specification relate generally to audio and video content playback tools, apps, and systems, and more particularly, to a versatile audio and video content playback navigation system and software-implemented processes for versatile navigation of audio and video content during playback.

Software audio and video content players, hardware/software audio and video content players, and other such audio and video players, including podcast players (all of which individual and combined are referred to as "existing audio and video players"), lack tools or mechanisms to easily skip forward or backward through an audio or video file or an audio or video content stream to find audio and/or video content of interest.

The existing audio and video players typically provide a play button, a pause button, and/or a combined play/pause button. Some of the existing audio and video players provide fast-forward or rewind tools to seek or scan through content. Many of the existing audio and video players provide a timeline along which a user can select various points to jump forward or backward to a different time point of the content.

Some of the existing audio and video players also offer "scrub" functionality which relates to the process of quickly moving through a timeline of content or a content track to locate a specific point in the content. However, none of the existing audio and video players provide a way to scrub forward or backward at varying rates through the content by a dragging action, such as by a finger interacting with a touch-sensitive screen or an elective mouse action of 'dragging' a user interface element one way or another. As such, a user of any of the existing audio and/or video players cannot perform an intuitive dragging action to scrub forward or backward through the content at variable rates.

Furthermore, the existing audio and video players that do provide a scrub feature are rare, and the scrubbing these rare players support is limited to defined-rate scrubbing. By contrast, none of the existing audio and video players support or provide variable-rate scrubbing (also referred as "scanning"). As such, a user would have no ability to vary the rate of speed at which the scrubbing forward or backward occurs through the audio and/or video content. Also, none of the existing audio and video players or other conventional playback mechanisms allow for sequential sampling of skipped audio and/or video content.

Beyond scrubbing, some of the existing audio and video players offer "seek" functionality. However, none of the existing audio and video players provide a swipe-based "skip" feature or any other way to skip forward or backward through the content by a swiping action. As such, a user of any of the existing audio or video players cannot perform an intuitive swiping action, such swiping a touchscreen in a particular direction to skip forward or backward through the content. Also, none of the existing audio and video players provide proportional length skipping that is proportional to the corresponding swipe action of the user. Additionally, none of the existing audio and video players combines all those functions together into a versatile and intuitive navigation user interface element.

Therefore, what is needed is a way to provide versatile audio and video content stream navigation in a simple and intuitive interface that combines the functions of playing and pausing playback, swiping to skip forward or backward through a content timeline for an amount of time that is proportional to a length of the swipe, and dragging to scrub forward or backward in timeline increments and at variable rates while playing snippets along the way.

BRIEF DESCRIPTION

A novel versatile audio and video content playback navigation system that provides an interactive navigation tool that is used to navigate through content during playback and processes for versatile navigation of audio and video content during playback are disclosed.

In some embodiments, the versatile audio and video content playback navigation system comprises (i) an interactive navigation tool that is visually output as a play/pause button (or a single interface button) and is configured to start/pause content playback and further configured to respond to taps, drags, and flicks/swipes, (ii) a skipped time user interface (UI) element that displays the amount of time being skipped when a user interacts with the interactive navigation tool to skip through a timeline of a content item, and (iii) a content playback system configured to load the content item, playback the content item, and skip through the content item at configurable amounts of time forward and backward upon the user interacting with the single interface button (which is visually output as a UI element by a user interface system of the content playback system for the interactive navigation tool) to skip through the timeline of the content item. In some embodiments, the content playback system is further configured to play sequentially sampled audio snippets or video snippets while skipping through the timeline of the content item.

In some embodiments, the interactive navigation tool functions as a precision navigation configuration tool when the play/pause button is dragged upward. While functioning as a precision navigation configuration tool, the interactive navigation tool of some embodiments is configured to set increasingly fine gradations of skipping and scanning when the user drags the play/pause button upward.

In some embodiments, the processes for versatile navigation of audio and video content during playback comprise (i) a versatile swipe-skip and drag-scan content navigation process, (ii) an artificial intelligence (AI) swipe-based skipping process for proportionally skipping through audio and video content during playback, and (iii) a drag and scan audio process for scrubbing audio and video content during playback while scanning and audibly outputting sequentially sampled snippets of the audio at speeds proportional to the scanning. In some embodiments, the processes for versatile navigation of audio and video content during playback are software-implemented processes. In some embodiments, user actions applied to the interactive navigation tool trigger execution of various instructions (or "steps") of the software-implemented processes. In some embodiments, the interactive navigation tool is visually output as a single interface button in the content player application. In some embodiments, the single interface button is a visible interactive user interface (UI) element that responds to taps, drags, and flicks/swipes.

In some embodiments, the content is an audio-only content item. In some embodiments, the content is a video content item. In some embodiments, the content is any type of audio/visual content item or any combination of content types. In some embodiments, the interactive navigation tool of the versatile audio and video content playback navigation system is configured to detect the type of content in realtime as the content byte stream is received and decoded.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
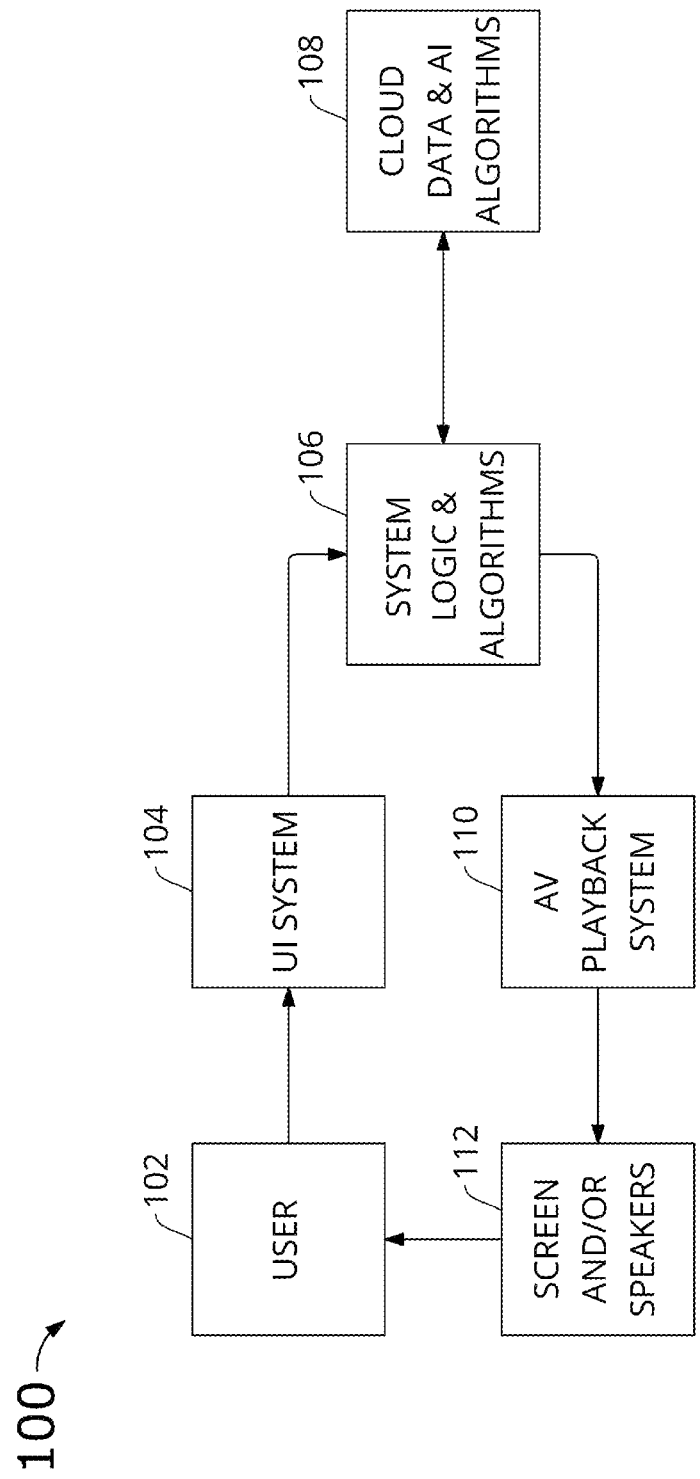
FIG. 1 conceptually illustrates a block diagram of a versatile audio and video content playback navigation system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

The present disclosure has been described herein with reference to various exemplary embodiments. However, those skilled in the art will recognize that changes in modifications can be made to the exemplary embodiments without departing from the scope of the present disclosure.

As used herein, the terms "comprises," "comprising," "includes," "including" and/or any other variation thereof, are intended to cover a non-exclusive inclusion, such that a system, process, method, article, and/or apparatus that comprises a list of elements does not include only those elements but can include other elements not expressly listed and/or inherent to such system, process, method, article, and/or apparatus.

It must also be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the disclosure pertains. Although a number of methods and materials similar to or equivalent to those described herein can be used in the practice of the present disclosure, certain preferred materials and methods are described herein.

The terms "first," "second," "third," "fourth," and the like in the description and in the claims, if any, are used for distinguishing between similar elements and not necessarily for describing a particular hierarchical, sequential, or chronological order. For instance, the terms "first direction" and "second direction" are not intended to suppose a particular direction, but are meant to described relational directions. Thus, it is to be understood that the terms so used are interchangeable under appropriate circumstances such that the embodiments described herein are, for example, capable of operation in sequences other than those illustrated or otherwise described herein. Furthermore, the terms "comprise," "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "up," "upward," "down," "downward," "diagonal," and the like in the description and in the claims, if any, are used for descriptive purposes and not necessarily for describing permanent relative positions. For instance, many of the forthcoming descriptions refer to left and/or right lateral-style swipes or dragging actions of a button in relation to a content timeline. However, it may be understood that a timeline could be oriented in a vertical or upright manner and that corresponding swipes and/or dragging actions may be actuated vertically, instead of laterally (or diagonally or a combination of vertically and laterally, as by design). Therefore, it is to be understood that the terms so used are interchangeable under appropriate circumstances such that the embodiments described herein are, for example, capable of operation in other orientations than those illustrated or otherwise described herein.

Also, the terms "plug-in," "integrated into," "incorporated," and the like should be broadly understood and refer to the joining together of functional encoded software modules that perform machine-encoded instructions on a computing device for software implementations that are incorporated as native code into a program or joined together with other software programs or applications.

Embodiments of the invention described in this specification include a versatile audio and video content playback navigation system and processes for versatile navigation of audio and video content during playback are disclosed. In some embodiments, the versatile audio and video content playback navigation system provides an interactive navigation tool that is used to navigate through content during playback. In some embodiments, the processes for versatile navigation of audio and video content during playback are software-implemented processes and user actions applied to the interactive navigation tool trigger execution of various instructions (or "steps") of the software-implemented processes. In some embodiments, the interactive navigation tool is visually output as a single interface button in a content player application. In some embodiments, the single interface button is a visible interactive user interface (UI) element that responds to taps, drags, and flicks/swipes.

In some embodiments, the interactive navigation tool and the software-implemented processes for versatile navigation of audio and video content during playback are integrated into a content playback system that is configured to play audio and/or video content. In some embodiments, the interactive navigation tool and the software-implemented processes for versatile navigation of audio and video content during playback are integrated into an existing content playback system as a plug-in to the existing content playback system. In some embodiments, the interactive navigation tool and the software-implemented processes for versatile navigation of audio and video content during playback are encoded into software of the content playback system at a native source code level of the content playback system.

In some embodiments, the content is any type of audio/visual content item or any combination of content types. The content may be digitally structured for playback and content navigation as a byte stream in any of several formats including, without limitation, a content file, a content stream, a content clip, a combination of multiple content streams, or a combination of multiple content files. Specifically, the content byte stream is retrieved, received, and/or loaded by the versatile audio and video content playback navigation system and processed for interactive, user-directed navigation through a content timeline by the interactive navigation tool.

In some embodiments, the content is an audio-only content item. The audio-only content item may be an audio clip, an audio file, or an audio stream. When the content is an audio stream, the audio stream may be a podcast audio stream. In some embodiments, the versatile audio and video content playback navigation system is used to swipe past non-podcast audio content, such as advertisements and other audio content layered within the podcast audio stream.

In some embodiments, the content is a video content item. The video content item may be a video file or a video stream. When the content is a video stream, the video stream may be a streaming video of a streaming video provider.

In some embodiments, the content is any type of audio/visual content item or any combination of content types. Specifically, the content may be an audio content item, a video content item (with an embedded audio content track), a combination of multiple audio content items configured to playback simultaneously, a combination of multiple video content items configured to playback simultaneously, or a combination of one or more audio content items conjoined for simultaneous playback with one or more video content items with or without their own embedded audio track, or any other kind of audio/visual content item. In some embodiments, the interactive navigation tool of the versatile audio and video content playback navigation system is configured to detect the type of content in realtime as the content byte stream is received and decoded.

In some embodiments, the versatile audio and video content playback navigation system comprises (i) an interactive navigation tool that is visually output as a single interface button (also referred to as the "single UI button", the "UI button", the "play/pause button", or simply, the "button") and is configured to start/pause content playback and further configured to respond to taps, drags, and flicks/swipes, (ii) a skipped time UI element that displays the amount of time being skipped when a user interacts with the interactive navigation tool to skip through a timeline of a content item, and (iii) an audio and video playback system configured to load the content item, playback the content item, and skip through the content item at configurable amounts of time forward and backward upon the user interacting with the single interface button (the UI button being visually output by the UI system of the content playback system for the interactive navigation tool) to skip through the timeline of the content item. In some embodiments, the audio and video playback system is further configured to play sequentially sampled audio snippets or video snippets while skipping through the timeline of the content item.

In some embodiments, the interactive navigation tool is visually output as the play/pause button and configured to start and pause playback of a content item when a user selects the play/pause button via a mouse click or a touch-based tap of the play/pause button.

In some embodiments, the interactive navigation tool functions as a content skipper when the play/pause button is swiped, going forward or backward through the content by an amount proportional to how far the play/pause button is swiped. Specifically, the interactive navigation tool is configured to skip forward through a timeline of the content item when the user swipes the play/pause button in a first direction (e.g., to the right). In some embodiments, the interactive navigation tool is further configured to skip backward through the timeline of the content item when the user swipes the play/pause button in the second direction (e.g., to the left).

In some embodiments, the interactive navigation tool functions as a content scrubber when the play/pause button is dragged, skipping forward or backward in increments, playing snippets along the way. In particular, the interactive navigation tool is configured to scan (or scrub) forward through the content item when the user drags the play/pause button in the first direction (e.g., to the right). In some embodiments, the interactive navigation tool is further configured to scan (or scrub) backward through the content item when the user drags the play/pause button in the second direction (e.g., to the left).

In some embodiments, the software-implemented processes for versatile navigation of audio and video content during playback comprise (i) a versatile swipe-skip and drag-scan content navigation process, (ii) an artificial intelligence (AI) swipe-based skipping process for proportionally skipping through audio and video content during playback, and (iii) a drag and scan audio process for scrubbing audio and video content during playback while scanning and audibly outputting sequentially sampled snippets of the audio at speeds proportional to the scanning.

In some embodiments, the interactive navigation tool functions as a precision navigation configuration tool when the play/pause button is dragged upward. While functioning as a precision navigation configuration tool, the interactive navigation tool of some embodiments is configured to set increasingly fine gradations of skipping and scanning when the user drags the play/pause button upward. In some embodiments, a default skip time range of a full forward-skip (by swipe) is configured to a maximum time range. For example, a maximum time range of thirty seconds set as the default skip time range for swipe-based skipping of content. In some embodiments, the default skip time range is reconfigurable by dragging the interactive navigation tool slightly upward, which results in a reconfiguration of the skip time range being reduced down to a fraction of the default skip time range. For example, the skip time range may be reduced to a maximum of ten seconds when the interactive navigation tool is slightly dragged upward. In some embodiments, dragging the interactive navigation tool further upward results in a reconfiguration of the skip time range being reduced to a smaller fraction of the default skip time range than the fraction when only slightly dragged upward. For example, the skip time range of the smaller fraction may be reduced to a maximum of two seconds when the play/pause button is dragged upward to a greater extent. This pattern continues on, so that the greater the distance of dragging, the more reduced the scope of swipe-based skip ahead time ranges. For example, dragging upward one unit (in a certain distance scale) may reduce the maximum skip time range to ten seconds, dragging upward two units (in same distance scale) may reduce the maximum skip time range to two seconds, while dragging the interactive navigation tool upward five units (same distance scale) may reduce the maximum skip time range to tens of milliseconds. The same principle can be applied to scanning where, as the user drags the interactive navigation tool to scan forward or back, the higher up the user pulls the interactive navigation tool, the finer the range of audio or video that is scanned. In this way, the interactive navigation tool supports dynamic time range reconfiguration by single-motion (upward) interaction, functioning as a precision navigation configuration tool that limits content skipping and scanning, triggered by subsequent interactions such as lateral swipes and drags, respectively, to the scope of the skip time range.

In some embodiments, the interactive navigation tool functions as a dynamic, real-time precision navigation configuration tool when the play/pause button is dragged upward while also being dragged in a lateral direction. In this case, the maximum skip time range (or maximum scan time range) is dynamically adjusted on-the-fly as the user drags the play/pause button in a lateral direction (left or right) while simultaneously dragging the button upward a certain distance. In effect, this type of user interaction would involve dragging the button in an upward, diagonal direction. For instance, suppose the horizontal drag range of the interactive navigation tool is ten units wide, with a maximum backwards swipe (e.g., leftward swipe) requiring a lateral movement of five units in a first direction (e.g., to the left), and a maximum forward swipe (e.g., rightward swipe) requiring a lateral movement of five units in an opposing direction (e.g., to the right). Further suppose that the maximum upward draggable space extends five units above the play/pause button. In that case, a swipe five units to the right and zero units high (meaning the interactive navigation tool is swiped purely to the right) might skip forward through the content thirty seconds, for example. By contrast, a swipe five units to the right and two units up (essentially a diagonal swipe of the interactive navigation tool to the right and slightly upwards) might instead skip forward by ten seconds or two seconds, depending on the default settings. At the extreme, a swipe five units right and five units up might skip only fifty milliseconds forward. In some embodiments, the interactive navigation tool functions as the dynamic, real-time precision navigation configuration tool with all user interface (UI) affordances that show the expressive range of the interactive navigation tool at any height to which the interactive navigation tool has been dragged. For instance, if a user drags the interactive navigation tool three units up, in either lateral direction, the UI would show that a full-range swipe left or right would only skip two seconds.

Embodiments of the versatile audio and video content playback navigation system, the interactive navigation tool, and the software-implemented processes for versatile navigation of audio and video content during playback described in this specification solve the issues noted above by providing an audio playback framework with tools/buttons that enable users to make fast and fine adjustments in the audio playback positions (timeline). In some embodiments, the versatile audio and video content playback navigation system and processes for versatile navigation of audio and video content during playback involves combining several usage modalities for different tools into a single interface button. Different user interactions with respect to the single interface button invoke different underlying tools and modalities. For instance, pressing on the button pauses/plays the audio. Swiping the button left/right skips audio backward/forward, respectively. Also, the tool captures swiping magnitude, such that the farther a user swipes (left or right), the greater the amount of time skipped along the audio timeline. Dragging the button, conversely, results in scanning the audio at proportionate speeds with sequentially sampled snippets of audio played back while and until the 'dragged' button is released.

Embodiments of the versatile audio and video content playback navigation system, the interactive navigation tool, and the software-implemented processes for versatile navigation of audio and video content during playback described in this specification differ from and improve upon currently existing options. In particular, the existing content playback systems do not work well because of their inherent limitations. For instance, users often wish to skip through varying amounts of audio (and/or video), but the existing content playback systems only provide fixed time skipping. Additionally, the existing content playback systems do not perform, or allow sampling of the skipped content so that the user does not overshoot an intended timeline location to stop skipping. By contrast, the versatile audio and video content playback navigation system allows finer control of the amount of audio skipped, and also makes it possible, through its scanning behavior, to sample the audio being skipped so that you can stop precisely where desired.

The versatile audio and video content playback navigation system, the interactive navigation tool, and the software-implemented processes for versatile navigation of audio and video content during playback of the present disclosure may be comprised of the following elements. This list of possible constituent elements is intended to be exemplary only and it is not intended that this list be used to limit the versatile audio and video content playback navigation system and processes for versatile navigation of audio and video content during playback of the present application to just these elements. Persons having ordinary skill in the art relevant to the present disclosure may understand there to be equivalent elements that may be substituted within the present disclosure without changing the essential function or operation of the versatile audio and video content playback navigation system and processes for versatile navigation of audio and video content during playback.

1. An interactive navigation tool that is presented as a visible interactive user interface (UI) element and is configured to play/pause content playback and also responds to taps, drags, and flicks/swipes for content navigation.

2. A content playback system that can skip configurable amounts of time forward and backward, and can play snippets of audio.
3. A skipped time UI element that displays the amount of time being skipped.

The various elements of the versatile audio and video content playback navigation system and processes for versatile navigation of audio and video content during playback of the present disclosure may be related in the following exemplary fashion. It is not intended to limit the scope or nature of the relationships between the various elements and the following examples are presented as illustrative examples only. When the user interacts with the visible interactive UI element (that is, the interactive navigation tool or the single interface button), the underlying framework of the versatile audio and video content playback navigation system configures the content playback system to skip amounts of audio/video proportionate to how far the user dragged or flicked/swiped the visible interactive UI element. If the visible interactive UI element is dragged, the skipped time UI element is automatically displayed so that the user knows how much audio is being skipped. Simultaneously, the visible interactive UI element (when dragged) configures the content playback system to repeatedly skip forward/backward by a proportional amount and play snippets of skipped audio along the way.

The versatile audio and video content playback navigation system, the interactive navigation tool, and the software-implemented processes for versatile navigation of audio and video content during playback of the present disclosure generally work by user interaction with the visible interactive UI element, which typically would present as a single tool/button. When implemented in software, the visible interactive UI element can be a feature of an overall content playback software application or may be integrated into an existing content playback system via an application programming interface (API) or added as a plug-in software module. As such, a software implementation of the interactive navigation tool would be interactive for a user of the software, such that the visible interactive UI element is configured to detect taps, drags, and flicks/swipes performed by the user (either as input into a touchscreen or via a cursor control device, such as a "mouse"). While there are many options for interaction, in this specification, a tap occurs when the visible interactive UI element is pressed and released within a short amount of time (e.g., up to two-hundred fifty milliseconds) and within a short screen distance (e.g., five pixels). A drag occurs when the visible interactive UI element is pressed, moved beyond a short screen distance (e.g., five pixels), and held beyond a short amount of time (e.g., more than two-hundred fifty milliseconds) before being released. A flick or swipe occurs when the visible interactive UI element is pressed, moved beyond a short screen distance (e.g., moved more than five pixels), and released within a short amount of time (e.g., up to two-hundred fifty milliseconds).

The content playback system is a software audio controller that can play audio starting from specified positions within an audio file or audio stream. For instance, the content playback system can play an audio file starting at two minutes and forty-two seconds. The content playback system can also be paused or stopped when needed.

Like the visible interactive UI element described above for the interactive navigation tool, the skipped time UI element can be implemented as a user interface element that shows the amount of time being skipped forward/backward. This can take a presentation form of any sort. For example, displaying the skipped time UI element in the form of a rule-like display that shows amounts of time that can be skipped (e.g., ten seconds, thirty seconds, sixty seconds, etc.). Furthermore, the skipped time UI element of some embodiments can highlight the amount of time being skipped by using a different font or color when rendering that amount.

When content playback is current paused/stopped and the user taps the visible interactive UI element, the underlying framework of the versatile audio and video content playback navigation system and the encoded instructions of the software-implemented processes for versatile navigation of audio and video content during playback trigger the content playback system to play the audio/video from the current position. Conversely, when the content playback is currently playing and the user taps the visible interactive UI element, the underlying framework/encoded instructions for the interactive navigation tool triggers the content playback system to pause/stop the audio or video content.

When the visible interactive UI element is flicked/swiped by the user, the underlying code framework for the versatile audio and video content playback navigation system triggers the content playback system to skip an amount of content proportional to the distance of the flick/swipe motion. For instance, a short swipe right may move the content forward by ten seconds, whereas a long swipe right may move it forward by sixty seconds. Additionally, when flicked/swiped by the user, the underlying code framework for the versatile audio and video content playback navigation system triggers the skipped time UI element to display a visual indication of the amount of content skipped (e.g., an animated piece of text that reads "+60s" to indicate that the audio skipped forward sixty seconds). The play/pause state of the content playback system is not modified by a flick/swipe action. That is, when content playback is presently ongoing, a flick/swipe interaction by the user just moves the playback location to a new time along the timeline (forward or backward) while seamlessly continuing to playback the content stream from the new time along the timeline (skipping the content in between). Also, when content playback is presently paused, a flick/swipe interaction causes the timeline location to change accordingly, but leaves the content in a paused playback state. When the user begins to drag the visible interactive UI element, the underlying code framework of the versatile audio and video content playback navigation system makes the skipped time UI element appear so that the user can see the amounts of time being skipped by dragging the visible interactive UI element different distances from its original position. The visible interactive UI element also makes the audio playback system periodically skip that amount of content and play a short snippet from the newly-skipped-to timeline position. For instance, if the visible interactive UI element is dragged one-hundred pixels to the right, it could direct the content playback system to start skipping thirty seconds at a time, playing two seconds of audio/video at each newly-skipped-to timeline position. If there is a change in the distance that the visible interactive UI element is dragged, the amount of content that the content playback system skips changes accordingly, with the possibility of inverting direction (e.g., the visible interactive UI element might start by being dragged a lot to the right and skipping thirty seconds forward at a time, and then be dragged slightly to the left and start skipping ten seconds backward at a time). This skipping and sampling of content continues, forward or backward as appropriate, until the visible interactive UI element is released, at which point the content continues playing unperturbed at its new position along the timeline.

By way of example, FIG. 1 conceptually illustrates a block diagram of a versatile audio and video content playback navigation system 100. As shown in this figure, the versatile audio and video content playback navigation system 100 involves a user 102 interacting with a device on which there is present a user interface (UI) system 104. Software-implemented logic and algorithms 106 utilize the UI system 104 of the device via one or more APIs. This enables the software-implemented logic and algorithms 106 to specify the visual appearance of the interactive navigation tool as well as the logical actions/steps which it carries out at runtime when the user 102 is interacting with the interactive navigation tool. Also, the software-implemented logic and algorithms 106 are integrated into an AV playback system 110, which is a content playback system configured to playback content in audio format, video format, audio/visual format, or any other digital bytestream-based form. A screen and audio speaker(s) 112 is involved in content playback. The screen component of the screen and audio speaker(s) 112 is a display screen of the device is configured to visually output the interactive navigation tool during playback or while the content is paused. Furthermore, the screen 112 is configured to visually output video as a content stream when the content is a video stream during playback. The speaker(s) 112 are configured to audibly output audible content during playback. In this way, the user 102 can see and hear the content during playback while also selectively interacting with the interactive navigation tool to skip forward/backward, scan ahead or behind, etc.

In some embodiments, the versatile audio and video content playback navigation system 100 is configured to connect to a cloud application service hosted by a cloud server over the Internet. This is demonstrated by the connection between the software-implemented logic and algorithms 106 and a cloud data and algorithms 108 component.

While the versatile audio and video content playback navigation system 100 described above demonstrates several components and the relationship between those components, very detailed descriptions of the logic and algorithms 106 are described next, by reference to FIGS. 2A and 2B, FIGS. 3A and 3B, and FIGS. 4A and 4B. First, FIGS. 2A and 2B are described next.

Figure 2A:
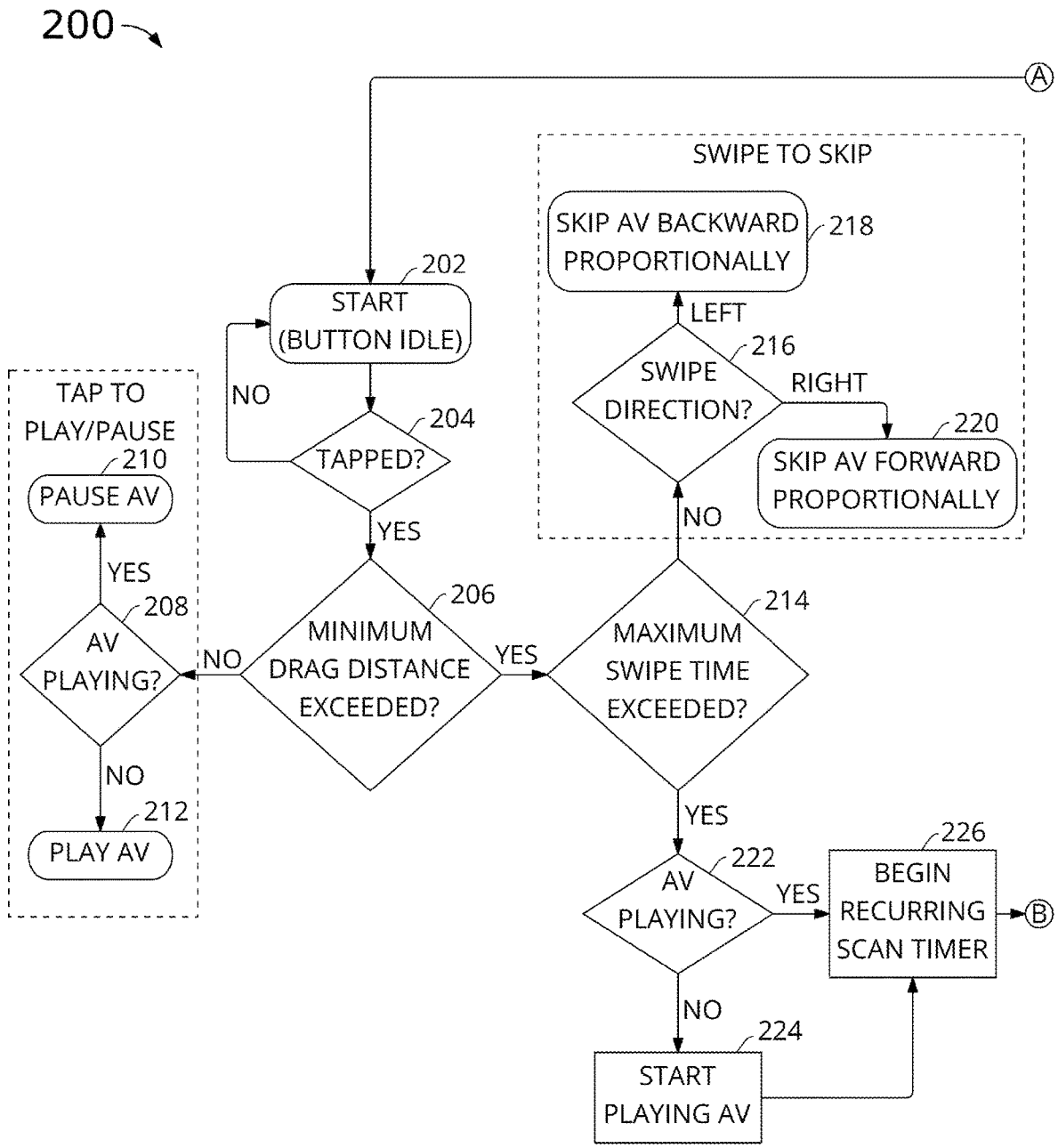
FIGS. 2A and 2B conceptually illustrate a standard process for versatile navigation of audio and video content during playback in some embodiments.
Figure 2B:
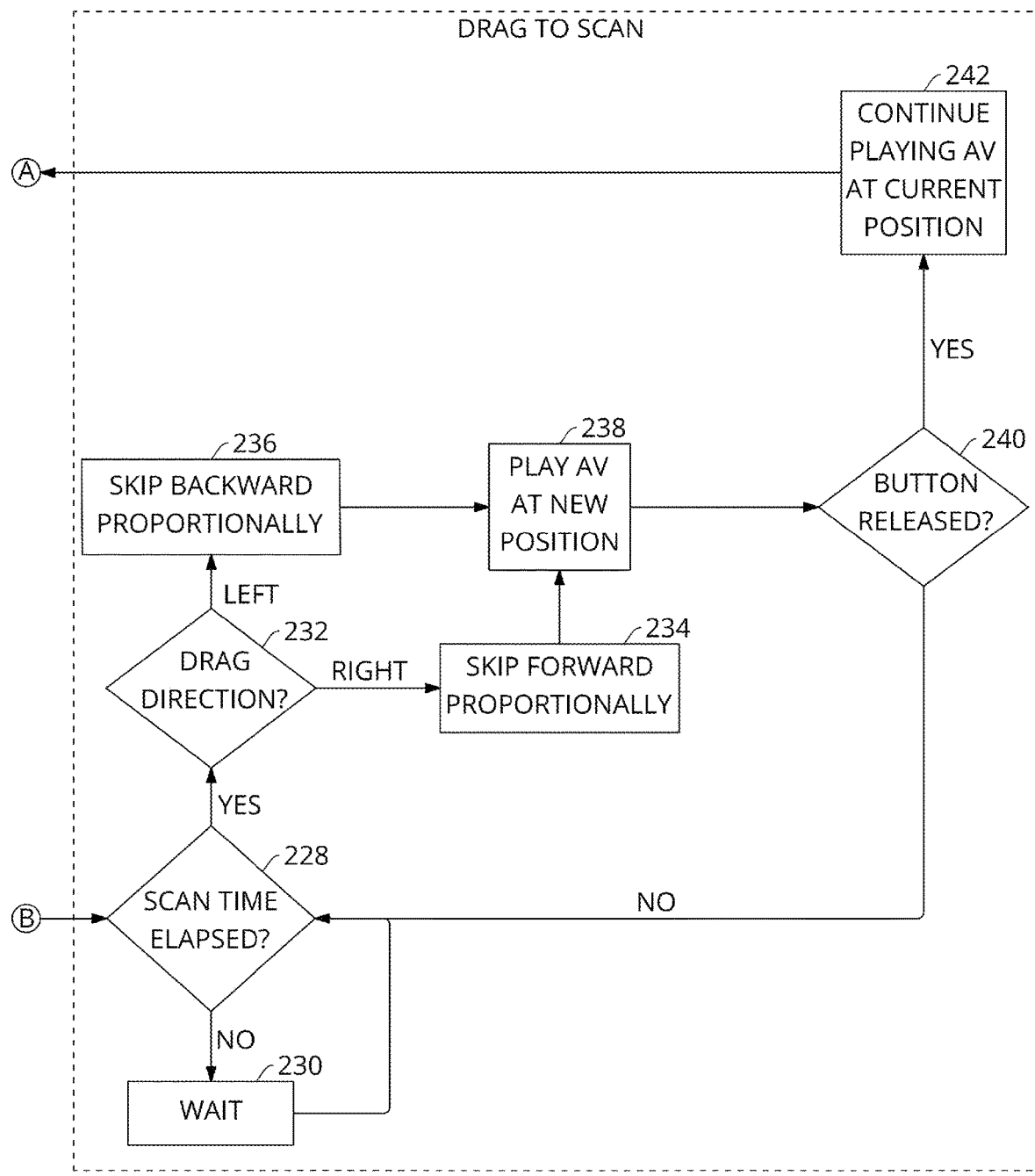

Specifically, FIGS. 2A and 2B conceptually illustrate a standard process for versatile navigation of audio and video content during playback 200. As noted above, the interactive navigation tool and the processes for versatile navigation of audio and video content during playback are implemented in software. In this case, the standard process for versatile navigation of audio and video content during playback 200 is performed by the software program that implements the standard process for versatile navigation of audio and video content during playback 200.

Referring first to FIG. 2A, the standard process for versatile navigation of audio and video content during playback 200 starts (at 202) with the interactive navigation tool (or "button") in an idle state. The standard process for versatile navigation of audio and video content during playback 200 proceeds to a step for determining (at 204) whether the button has been tapped or not. When the button is affirmatively determined (at 204) to have been tapped ('YES'), the standard process for versatile navigation of audio and video content during playback 200 proceeds to the next step for determining (at 206) whether a minimum drag distance has been exceeded with respect to the tapping of the button. This step (at 206) is described below. On the other hand, when the button has not been tapped ('NO'), the standard process for versatile navigation of audio and video content during playback 200 returns to the start (at 202) with the button in the idle state and continues immediately to the determination (at 204) of whether the button has been tapped. This loop continues as long as the button has not been tapped. Eventually, when the user has tapped the button or made some interaction with respect to the button, then the standard process for versatile navigation of audio and video content during playback 200 proceeds to the determination (at 206) other whether or not the tap/interaction amounted to a drag or a swipe.

In some embodiments, the minimum drag distance is set to some small distance, such as five pixels or so. This small distance ensures that when a user simply intends to pause or continue playback of the content (by a 'tap' of the interactive navigation tool button), the standard process for versatile navigation of audio and video content during playback 200 will not engage in processing for swipe-skipping of content and/or drag-scanning of content. Thus, when the standard process for versatile navigation of audio and video content during playback 200 determines (at 206) that the detected 'tap' interaction did not exceed the minimum drag distance, then the standard process for versatile navigation of audio and video content during playback 200 proceeds to a step for determining (at 208) whether the AV content is playing or not. The AV content may be audio-only content, video-only content, or combined audio/visual content. When the standard process for versatile navigation of audio and video content during playback 200 determines (at 208) that the content is affirmatively and currently playing ('YES'), the standard process for versatile navigation of audio and video content during playback 200 proceeds to a step for pausing playback of the content (at 210). By contrast, when the standard process for versatile navigation of audio and video content during playback 200 determines (at 208) that the AV content is not presently playing ('NO'), then the content must be in the paused state and the standard process for versatile navigation of audio and video content during playback 200 proceeds to play the AV content (at 212). The user can repeatedly tap the interactive navigation tool button as much and as often as desired and, so long as each tap does not exceed the minimum drag distance threshold, the standard process for versatile navigation of audio and video content during playback 200 will determine (at 208) whether the AV content is currently in the playback state or not and proceed to the corresponding step to pause playback (at 210) when currently playing or play the content (at 212) from the paused timeline location when the content is presently paused.

Turning back to the determination (at 206), when user's tap interaction is one that exceeds the minimum drag distance ('YES'), then the standard process for versatile navigation of audio and video content during playback 200 moves forward to a different set of steps, starting with a step for determining (at 214) whether the user's 'tap' interaction with the interactive navigation tool button exceeded a maximum swipe time or not (at 214). When the maximum swipe time threshold is exceeded by the user's 'tap' interaction ('YES'), then the standard process for versatile navigation of audio and video content during playback 200 proceeds to a step for determining (at 222) whether the AV content is playing or not. This step and subsequent steps are described further below. On the other hand, when the user's 'tap' interaction with the button does not exceed the maximum swipe time threshold ('NO'), then the standard process for versatile navigation of audio and video content during playback 200 moves on to the next step for determining (at 216) which direction the 'swipe' interaction is made (e.g., left or right). When the swipe direction is determined (at 216) to be left, the standard process for versatile navigation of audio and video content during playback 200 triggers skipping backward through the AV content by a timeline duration that is proportional to the swipe interaction of the user. Yes, when the swipe direction is determined (at 216) to be right, then the standard process for versatile navigation of audio and video content during playback 200 triggers a forward skipping through the AV content, again by an amount of time proportional to the length of the swipe interaction the user made with respect to the interactive navigation tool button.

After skipping through the content based on the swipe length, the user may repeatedly swipe the interactive navigation tool button forward (right) or backward (left) as much and as often as desired and, so long as each swipe is made is a recognizable direction (e.g., not downward, but left or right with options to diagonally swipe upward+left or upward+right to vary the maximum skip distance), then the standard process for versatile navigation of audio and video content during playback 200 will skip forward or backward through the timeline of the AV content by an amount proportional to the swiping action of the user (taking into account any upward interactions which may reconfigure the maximum skip distance). Similarly, the user may simply tap and re-tap the play/pause button after a swipe/skip forward or backward or between swipe/skip forward or backward through the AV content, each 'tap' of the interactive navigation tool button causing the standard process for versatile navigation of audio and video content during playback 200 to determine (at 206) whether the minimum drag distance is exceeded and, when the minimum drag distance is not exceeded, to determine (at 208) whether the AV content is currently in the playback state or not and proceed to the corresponding step to pause playback (at 210) when currently playing or play the content (at 212) from the paused timeline location when the content is presently paused.

Now, turning back to the determination (at 214) of whether the maximum swipe time was exceeded, when the standard process for versatile navigation of audio and video content during playback 200 affirmatively does determine (at 214) that the maximum swipe time was exceeded ('YES'), then the standard process for versatile navigation of audio and video content during playback 200 determines (at 222) whether the AV content is presently playing or not. When the AV content is affirmatively determined to be playing currently ('YES'), the standard process for versatile navigation of audio and video content during playback 200 begins a recurring scan timer (at 226). However, when the AV content is not presently playing ('NO'), the standard process for versatile navigation of audio and video content during playback 200 first starts playback of the AV content (at 224) from the location at which it was paused (which may be the start or somewhere in the middle of the timeline for the AV content). Then the standard process for versatile navigation of audio and video content during playback 200 proceeds to the step for starting the recurring scan timer (at 226).

After staring the recurring scan timer (at 226), the standard process for versatile navigation of audio and video content during playback 200 proceeds to the next step, which is described next, by reference to FIG. 2B (illustrated as flow arrows connecting through the labeled 'B' reference circle).

Specifically, the standard process for versatile navigation of audio and video content during playback 200 determines (at 228) whether the scan time has elapsed or not. When the scan time has not elapsed, the standard process for versatile navigation of audio and video content during playback 200 waits (at 230). The standard process for versatile navigation of audio and video content during playback 200 of some embodiments repeatedly cycles through the loop of determining (at 228) and waiting (at 230) until the scan time has elapsed. Understand that the determining/waiting cycle/loop is needed to ensure that the amount of content being scanned is proportional to the distance and time of the user's drag interaction of the button, such that the clips of audio and/or video may be played during the scanning forward or backward, which is dependent on the scope of the user's dragging interaction and is described next.

Specifically, when the standard process for versatile navigation of audio and video content during playback 200 determines (at 228) that the scan time (from the recurring scan time at 226) has elapsed ('YES'), then the standard process for versatile navigation of audio and video content during playback 200 moves on to the next step for determining (at 232) in which direction the user has made the drag interaction (left or right). When the direction is determined (at 232) to be right, the standard process for versatile navigation of audio and video content during playback 200 skips forward through the AV content (at 234) to a new forward position in the timeline of the AV content, which is based on an amount proportional to the user's rightward drag interaction. Then the standard process for versatile navigation of audio and video content during playback 200 sets a current position for playback of the AV content at the new forward position in the timeline (at 238). On the other hand, when the direction is determined (at 232) to be left, then the standard process for versatile navigation of audio and video content during playback 200 skips backward through the AV content (at 236) to a new backward position in the timeline of the AV content, which is based on the amount proportional to the leftward drag interaction of the user. This is followed by the step for setting the current position for playback of the AV content at the new backward position in the timeline (at 238).

After setting the current position for playback of the AV content (at 238), the standard process for versatile navigation of audio and video content during playback 200 then moves on to a step for determining (at 240) whether the user has released the interactive navigation tool button or not. When the user has not released the button ('NO'), the standard process for versatile navigation of audio and video content during playback 200 returns to the step for determining (at 228) whether the scan time has elapsed or not. On the other hand, when the interactive navigation tool button has affirmatively been released by the user ('YES'), then the standard process for versatile navigation of audio and video content during playback 200 transitions to a step for continuing playback of the AV content at the current position (at 242). Then the standard process for versatile navigation of audio and video content during playback 200 returns (as illustrated by flow arrows connecting through the labeled 'A' reference circle) to the step for starting (at 202) where the button is in the idle state, which is described above, by reference to FIG. 2A.

Figure 3A:
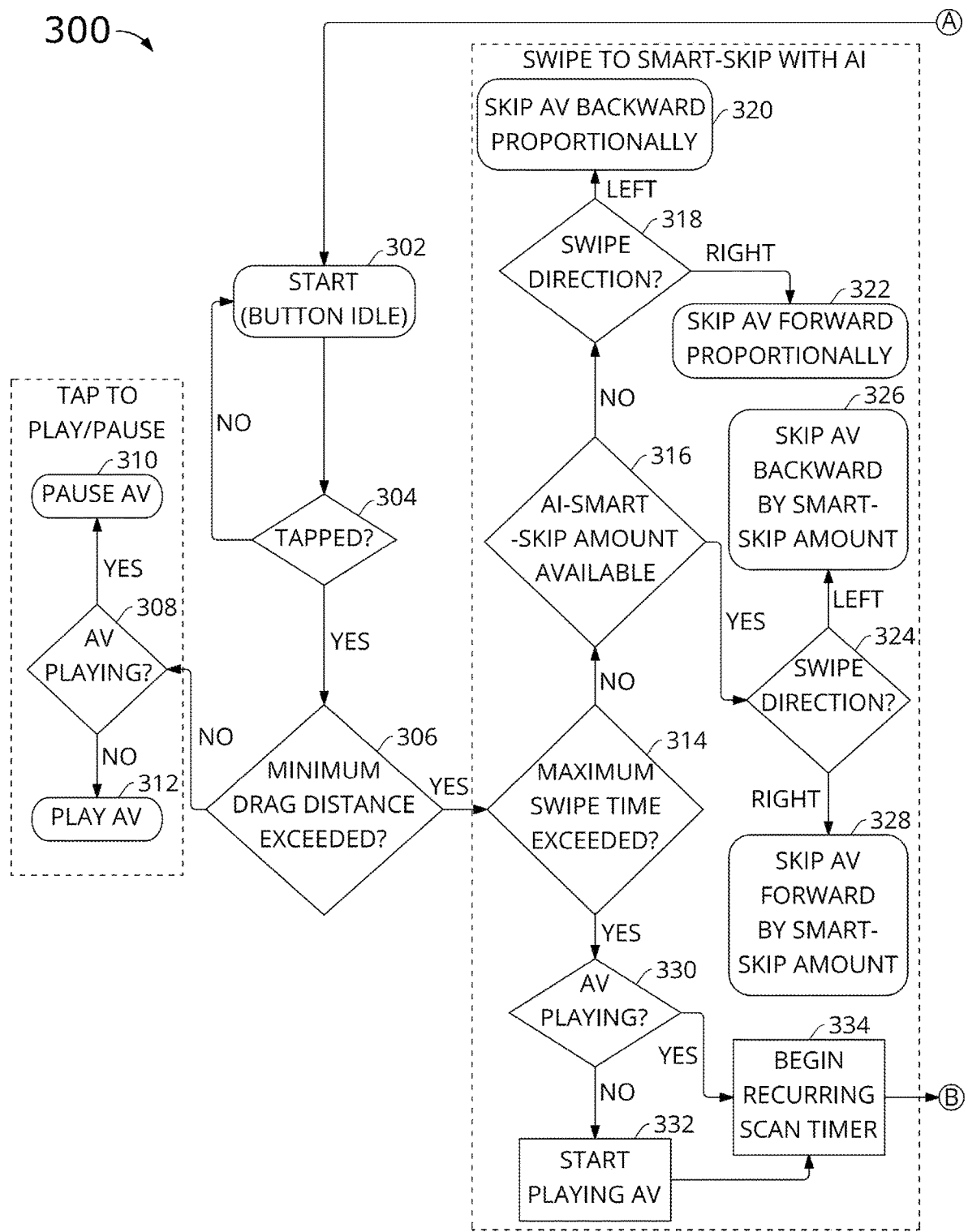
FIGS. 3A and 3B conceptually illustrate an artificial intelligence (AI) swipe-based skipping process for proportionally skipping through audio and video content during playback in some embodiments.
Figure 3B:
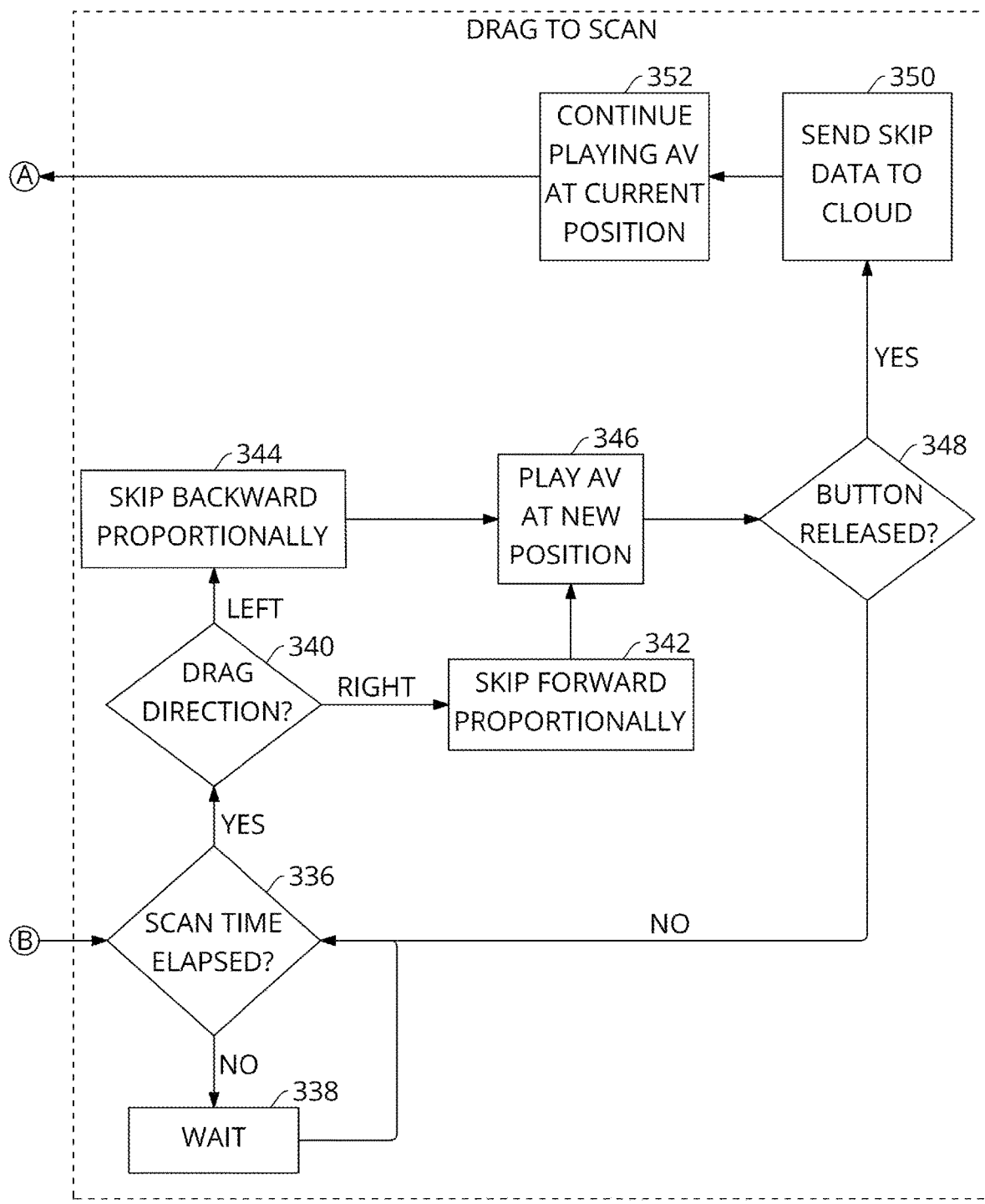

Turning to another example, FIGS. 3A and 3B conceptually illustrate an artificial intelligence (AI) swipe-based skipping process 300 for proportionally skipping through audio and video content during playback. As shown in this figure, the AI swipe-based skipping process 300 is similar to the standard process for versatile navigation of audio and video content during playback 200, but includes several steps that actuate a swipe-to-smart-skip-with-AI function and which sends skip data to the cloud for storage and processing.

Accordingly, the AI swipe-based skipping process 300 starts (at 302) with the interactive navigation tool button in the idle state and proceeds to determine (at 304) whether the interactive navigation tool button has been tapped or not. When affirmatively tapped ('YES'), the AI swipe-based skipping process 300 determines (at 306) whether a minimum drag distance has been exceeded with respect to the tapping of the button or, when not tapped ('NO'), continually loops through the start/idle step (at 302) and the tap determination step (at 304) until a tap is affirmatively acknowledged. When the AI swipe-based skipping process 300 determines (at 306) that the detected 'tap' interaction did not exceed the minimum drag distance, then the AI swipe-based skipping process 300 proceeds to a step for determining (at 308) whether the AV content is playing or not. When the AV content is currently playing ('YES'), the AI swipe-based skipping process 300 pauses playback of the content (at 310). However, when the AV content is not presently playing ('NO'), then the AI swipe-based skipping process 300 proceeds to play the AV content (at 312). As before, the user can repeatedly tap the interactive navigation tool button as much and as often as desired and, so long as each tap does not exceed the minimum drag distance threshold, the AI swipe-based skipping process 300 will determine (at 308) whether the AV content is currently in the playback state or not and proceed to the corresponding step to pause playback (at 310) when currently playing or play the content (at 312) from the paused timeline location when the content is presently paused.

Turning back to the determination (at 306), when user's tap interaction is one that exceeds the minimum drag distance ('YES'), then the AI swipe-based skipping process 300 moves forward to a different set of steps, starting with a step for determining (at 314) whether the user's 'tap' interaction with the interactive navigation tool button exceeded a maximum swipe time or not (at 314). When the maximum swipe time threshold is exceeded by the user's 'tap' interaction ('YES'), then the AI swipe-based skipping process 300 proceeds to a step for determining (at 330) whether the AV content is playing or not. By contrast, when the maximum swipe time threshold is not exceeded ('NO') the AI swipe-based skipping process 300 proceeds through a series of AI-based steps, as described next.

Specifically, the AI swipe-based skipping process 300 determines (at 316) whether there is an AI-smart-skip amount available or not (at 316). When there is an AI-smart-skip amount available ('YES'), the AI swipe-based skipping process 300 determines (at 324) which direction the swipe is made (left or right), which is described further below.

However, where there is no determined AI-smart-skip amount available ('NO'), the AI swipe-based skipping process 300 determines (at 318) in which direction the swipe is made (left or right). When the swipe direction is left, the AI swipe-based skipping process 300 skips backward through the AV content by a timeline amount that is proportional to the swipe (at 320). On the other hand, when the direction of swipe is determined (at 318) to be to the right, then the AI swipe-based skipping process 300 skips forward through the AV content by an amount of time that is proportional to the swipe (at 322).

Turning back to the determination (at 324) of which direction the swipe is made: when the swipe direction is determined (at 324) to be rightward, the AI swipe-based skipping process 300 skips forward through the AV content by the AI-smart-skip amount (at 328). In some embodiments, the AI-smart-skip amount is based on an AI model that is trained on a particular user's interaction with the interactive navigation tool button and is refined by more data training sets as the user continues to interact with the button. Thus, the AI-smart-skip amount may vary across different users based on their own idiosyncratic swiping interactions with the interactive navigation tool button.

Referring back to the determination (at 324), when the swipe direction is a leftward swipe direction, then the AI swipe-based skipping process 300 skips backward through the AV content by the AI-smart-skip amount (at 326).

Now turning back to the determination (at 330), when the AV content is affirmatively determined to be playing ('YES'), the AI swipe-based skipping process 300 begins a recurring scan timer (at 334). However, when the AV content is not presently playing ('NO'), the AI swipe-based skipping process 300 first starts playback of the AV content (at 332) from its current 'pause' location and then moves on to the step for starting the recurring scan timer (at 334). After staring the recurring scan timer (at 334), the AI swipe-based skipping process 300 proceeds to the next step, which is described next, by reference to FIG. 3B (illustrated as flow arrows connecting through the labeled 'B' reference circle).

Specifically, the AI swipe-based skipping process 300 determines (at 336) whether the scan time has elapsed or not. When the scan time has not elapsed, the AI swipe-based skipping process 300 waits (at 338) and repeatedly cycles through the loop of determining (at 336) and waiting (at 338) until the scan time has elapsed. However, when the scan time has elapsed ('YES'), then the AI swipe-based skipping process 300 proceeds to a step for determining (at 340) the drag direction (left or right). When the direction is rightward, the AI swipe-based skipping process 300 skips forward through the AV content (at 342) to a new forward position in the timeline of the AV content, which is based on an amount proportional to the user's rightward drag interaction. Then the AI swipe-based skipping process 300 sets a current position for playback of the AV content at the new forward position in the timeline (at 346). On the other hand, when the drag direction is determined (at 340) to be left, then the AI swipe-based skipping process 300 skips backward through the AV content (at 344) to a new backward position in the timeline of the AV content, which is based on the amount proportional to the leftward drag interaction of the user. This is followed by the step for setting the current position for playback of the AV content at the new backward position in the timeline (at 346).

After setting the current position for playback of the AV content (at 346), the AI swipe-based skipping process 300 then moves on to a step for determining (at 348) whether the user has released the interactive navigation tool button or not. When the user has not released the button ('NO'), the AI swipe-based skipping process 300 returns to the step for determining (at 336) whether the scan time has elapsed or not. On the other hand, when the interactive navigation tool button has affirmatively been released by the user ('YES'), then the AI swipe-based skipping process 300 transitions to a step for sending skip data to the cloud (at 350). Specifically, the skip data is aggregated and sent to a cloud storage as a new AI test data set to retrain the AI model for this specific user. After uploading the skip data to the cloud (at 350), the AI swipe-based skipping process 300 continues playback of the AV content at the current position (at 352). Then the AI swipe-based skipping process 300 returns (as illustrated by flow arrows connecting through the labeled 'A' reference circle) to the step for starting (at 302) where the button is in the idle state, which is described above, by reference to FIG. 3A.

Figure 4A:
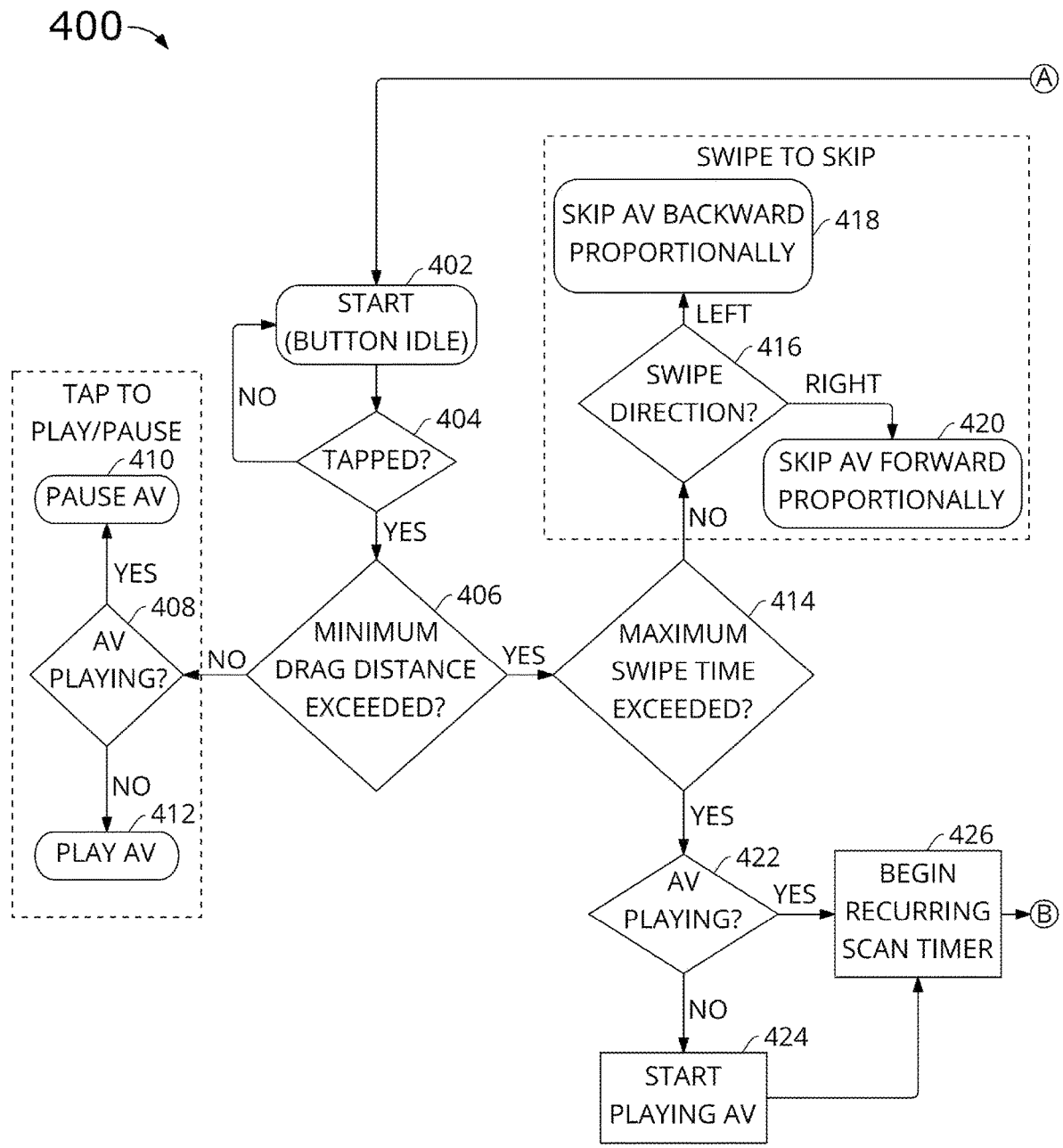
FIGS. 4A and 4B conceptually illustrate a drag sound indicator audio process for scrubbing audio and video content during playback while scanning and audibly outputting sequentially sampled snippets of the audio at speeds proportional to the scanning in some embodiments.
Figure 4B:
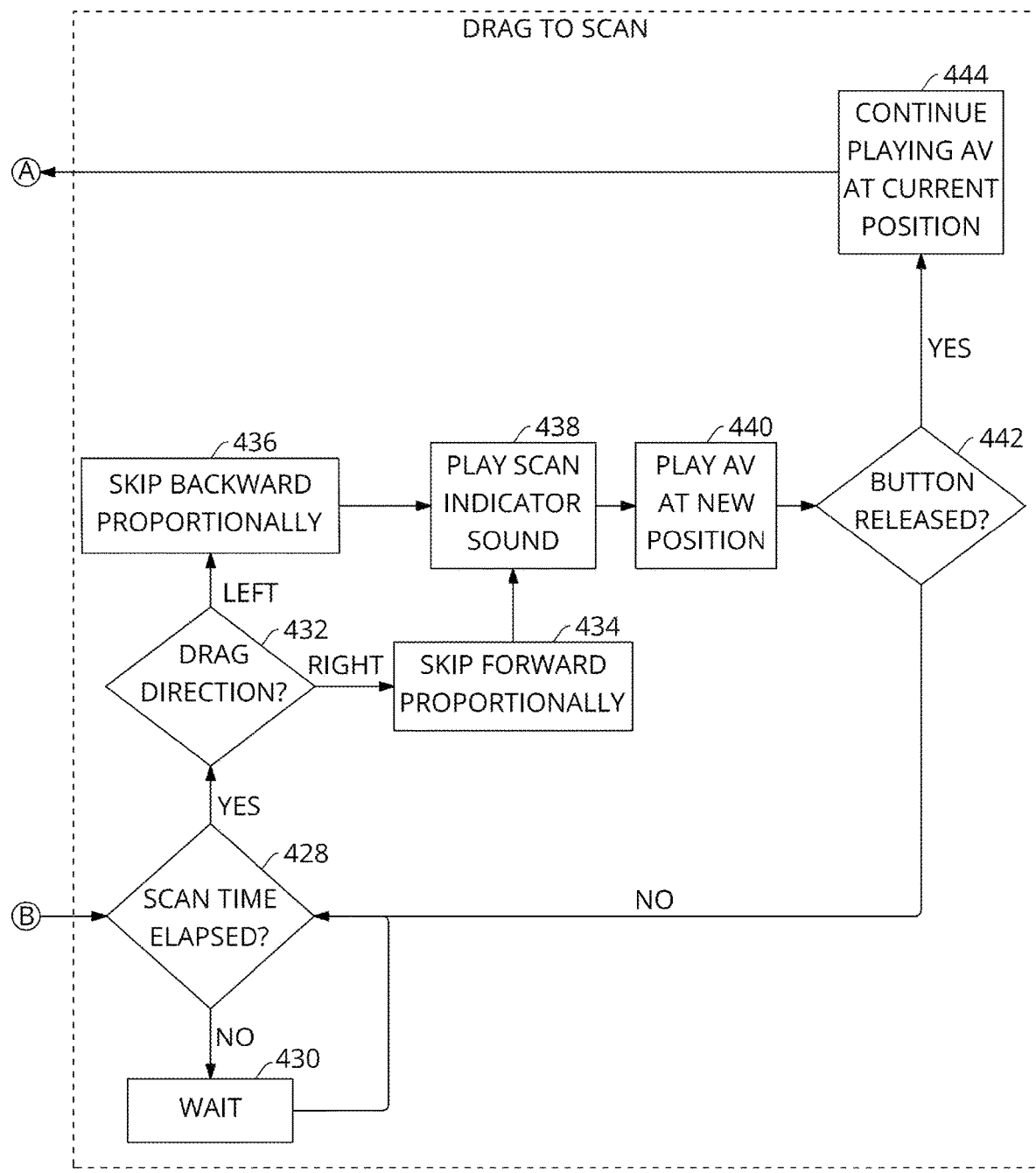

By way of another example, FIGS. 4A and 4B conceptually illustrate a drag sound indicator audio process for scrubbing audio and video content during playback while scanning and audibly outputting sequentially sampled snippets of the audio at speeds proportional to the scanning 400. The drag sound indicator audio process for scrubbing audio and video content during playback while scanning and audibly outputting sequentially sampled snippets of the audio at speeds proportional to the scanning 400 is similar to the standard process for versatile navigation of audio and video content during playback 200, described above, by reference to FIG. 2, except that before the step for playing the AV content at the new position (at 238 in FIG. 2 and at 440 in FIG. 4), the drag sound indicator audio process for scrubbing audio and video content during playback while scanning and audibly outputting sequentially sampled snippets of the audio at speeds proportional to the scanning 400 performs a step for playing a scan indicator sound (at 438) which provides the user with an audible alert of the skipping forward or backward progress. This is desirable feature because users may sometimes accidentally skip beyond the desired position/location along the timeline when dragging the visible interactive UI element. Besides providing such an audible indicator sound to the user, there are other ways to compensate for this. For instance, the interactive navigation tool of some embodiments can undo a fraction of the most recent amount skipped when it is released. This would look like a quick rewind through the content (or fast-forward if the following scenario is inverted), such as if a user skipped sixty seconds forward multiple times and then releases, the interactive navigation tool could direct the content playback system to skip backward by ten seconds prior to resuming content playback. This is a form of compensation to offset imperfect user reaction times. However, the scan indicator sound is also an effective mechanism to prevent or mitigate inadvertent skipping beyond an intended duration.

Referring specifically to FIG. 4, the drag sound indicator audio process 400 starts with the interactive navigation tool button in the idle state (at 402) and proceeds to determine (at 404) whether the interactive navigation tool button has been tapped or not. When affirmatively tapped ('YES'), the drag sound indicator audio process 400 determines (at 406) whether a minimum drag distance has been exceeded or not. When not exceeded ('NO'), the drag sound indicator audio process 400 determines the current AV content playing mode (at 408) as either currently playing or not currently playing. When currently playing ('YES'), the drag sound indicator audio process 400 pauses playback of the content (at 410) but when not currently playing ('NO'), then the drag sound indicator audio process 400 triggers playback of the AV content (at 412).

Turning back to the determination (at 406), when user's tap interaction is one that exceeds the minimum drag distance ('YES'), then the drag sound indicator audio process 400 determines (at 414) whether the maximum swipe time is exceeded or not. When exceeded ('YES'), the drag sound indicator audio process 400 determines (at 422) whether the AV content is playing or not. When not exceeded ('NO'), the drag sound indicator audio process 400 identifies/determines (at 416) the swipe direction. When the swipe direction is identified as left, the drag sound indicator audio process 400 skips backward through the AV content by an amount proportionate to the swipe distance (at 418). When the direction is right, the drag sound indicator audio process 400 skips forward through the AV content by a timeline amount proportional to the swipe distance (at 420).

Referring back to the determination (at 422) of whether the AV content is currently playing or not, when the AV content is not currently playing ('NO'), the drag sound indicator audio process 400 starts playback of the AV content at its current timeline position (at 424) and proceeds to a step at which it starts a recurring scan timer (at 426). On the other hand, when the AV content is determined (at 422) to be currently playing ('YES'), the drag sound indicator audio process 400 begins a recurring scan timer (at 426) and continues to the next steps (which flow through the 'B' labeled reference circle into FIG. 4B, which is described next).

Referring specifically to FIG. 4B, the drag sound indicator audio process 400 proceeds to the step for determining (at 428) whether the scan time (from the recurring scan timer) has elapsed or not. When the scan time has not elapsed ('NO'), the drag sound indicator audio process 400 waits (at 430) and cycles back to the determination step (at 428) and continues waiting (at 430) in a looping cycle until the scan time has affirmatively elapsed. Thus, when the drag sound indicator audio process 400 determines (at 428) that the scan time has now elapsed ('YES'), the drag sound indicator audio process 400 then proceeds to a determination (at 432) of which drag direction was performed (left or right). When the draft direction is determined to be rightward, the drag sound indicator audio process 400 skips forward through the AV content by a proportional amount of time (at 434) followed by playing the scan indicator sound (at 438) to audibly alert the user. By contrast, when the draft direction is determined to be to the left, the drag sound indicator audio process 400 skips proportionally backward through the AV content (at 436) followed by playing the scan indicator sound (at 438) to audibly alert the user. Then the drag sound indicator audio process 400 proceeds to play the AV content at the new position (at 440). This is followed by the determination (at 442) of whether or not the user has released the interactive navigation tool button. When the button has not been released ('NO'), the drag sound indicator audio process 400 repeats the steps mentioned above, transitioning back to the determination (at 428) of whether the scan time has elapsed or not. However, when the button is released ('YES'), the drag sound indicator audio process 400 continues playing the AV content at the current position (at 444), and then transitions back to the idle state at which it started (at 402), via the flow through the 'A' labeled reference circle as shown in FIG. 4A.

To make the versatile audio and video content playback navigation system, the interactive navigation tool, and the software-implemented processes for versatile navigation of audio and video content during playback of the present disclosure, the underlying code framework would be designed and developed, and then implemented in software for an application on any device that runs software and is capable of playing audio and/or video content (e.g., on a computer, a smartphone, a tablet computing device, etc.). This is typically done by coding using application programming interfaces (APIs) provided by the target device's operating system. User interface (UI) elements can be provided by a UI system of the device's operating system (e.g., UIView on iOS, View on Android, UIElement on Windows, etc.). To differentiate between taps, drags, and swipes, the current time should be captured when the interactive navigation tool is first tapped. The position of the tap should then be actively tracked until it is released. As movement of the tap is detected before its release, the action can be interpreted as a drag as soon as a minimum time threshold is passed (e.g., more than two-hundred fifty milliseconds after the element was first tapped). As the drag moves different distances from the origin of the tap, the content playback system can be made to skip forward or backward by varying amounts. When the tap is released, the final location should also be captured. If the total time between the initial tap and its release is less than the drag threshold (e.g., two-hundred fifty milliseconds), the action is either a tap or a flick/swipe. Specifically, it is a tap if the release position is within a small screen distance from the initial tap origin (e.g., within five pixels) and it is a flick/swipe if it is more than that. When it is a tap, the content playback system plays or pauses the audio and/or video content stream, based on the current playback state (playing or paused) of the content. When it is not a tap, but instead is a flick/swipe, the content playback system skips forward or backward by an amount of time proportional to the total distance of the swipe (e.g., if the swipe was one-hundred pixels to the right, the audio playback system may skip forward through the audio by thirty seconds).

The audio playback system can be implemented using the device operating system's audio and video APIs (e.g., AVPlayer on iOS, MediaPlayer on Android, Windows Core Audio on Windows). Each of these interfaces has the capability of playing/pausing and skipping specific amounts of time forward or backward in the played audio. Like the visible interactive UI element, the skipped time UI element can be implemented using the device operating system's visual display APIs.

To use the versatile audio and video content playback navigation system, the interactive navigation tool, and the software-implemented processes for versatile navigation of audio and video content during playback of the present disclosure, a user would simply interact with the visible interactive UI element as described above, whether the visible interactive UI element is integrated into an existing content playback system/application or incorporated into a newly coded and designed content playback system. The details above also apply to content playback system in which physical interactive buttons of a hardware device for the content playback system are present. Thus, the behaviors described above could easily be adapted and implemented for such hardware devices. For instance, a physical audio/visual player that has a physical hardware button than can be touched, dragged, or swiped.

In this specification, the terms "software implementation", "application", and "program" (collectively and individually referred to as "software") are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
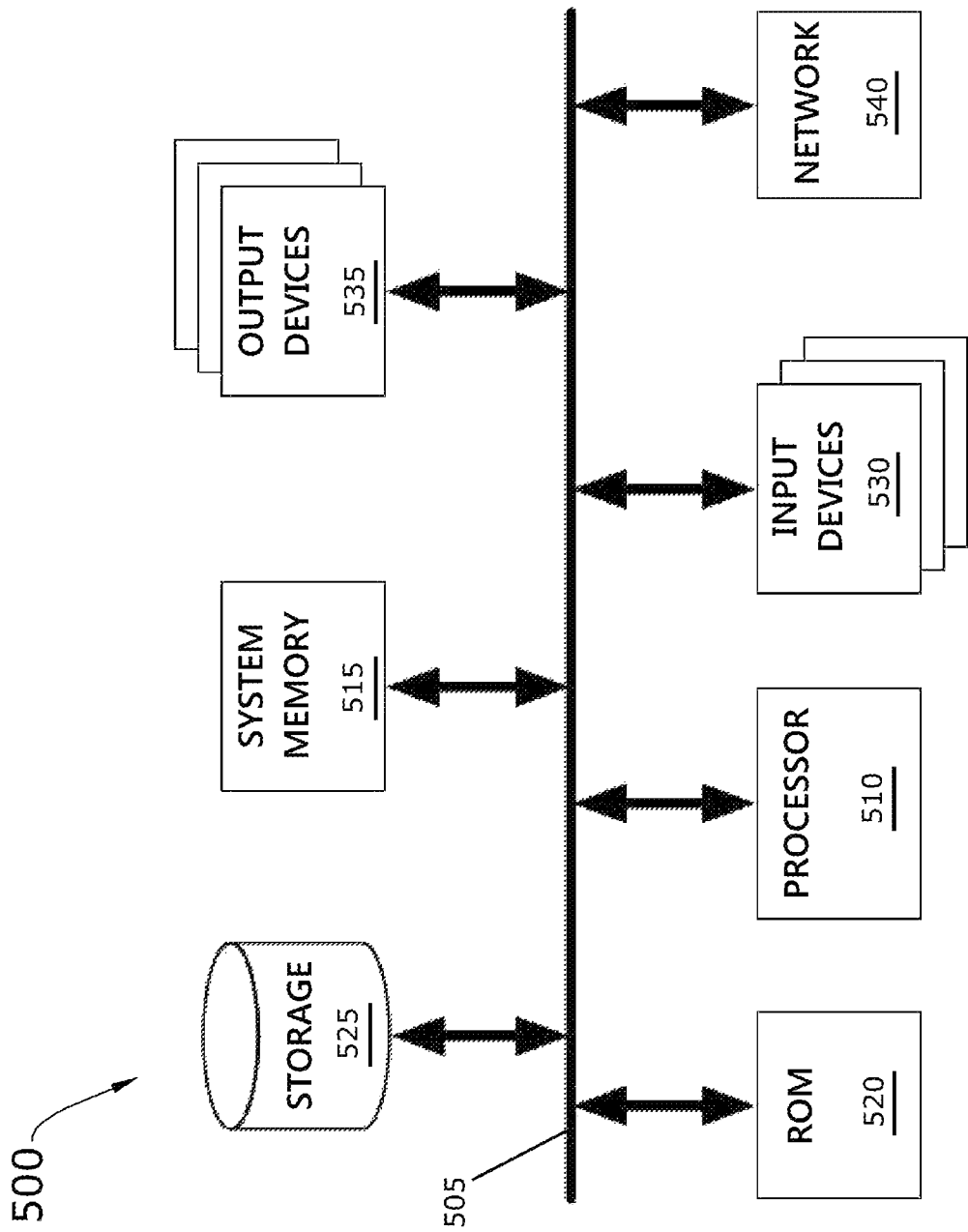
FIG. 5 conceptually illustrates an electronic system with which some embodiments of the invention are implemented.

By way of example, FIG. 5 conceptually illustrates an electronic system 500 with which some embodiments of the invention are implemented. The electronic system 500 may be a computer (personal computer "PC", laptop, single board computer "SBC", desktop computer, etc.), phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525. From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a flash drive, a memory card, a floppy disk) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"), which may act to control interaction between the user and the interactive navigation tool ("button"). The output devices 535 audible output sound, such as music, soundtrack for visual content, etc., and display visual content, such as images, videos, animations, and other visual content generated by the electronic system 500. The output devices 535 may also include printers. Examples of visual display output devices 535 include, without limitation, liquid crystal displays (LCD) and organic light emitting diode (OLED) displays. Example of audio output devices 535 include, without limitation, audio speakers, embedded speakers, externally attached speakers, etc. Some embodiments include devices such as a touchscreen that functions as both input and output devices, visually outputting the interactive navigation tool button, as well as visual content that may be currently playing or in a paused state of operation.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2A-2B, 3A-3B, and 4A-4B conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

I claim:

1. A versatile audio and video content playback navigation system comprising:
    an electronic system operable by a user and comprising a processor, a display screen, a content playback system, and a data storage unit that stores instructions of the content playback system that are configured to control playback of a content stream;
    a user interface (UI) of the content playback system that is visually output onto the display screen of the electronic system when the content playback system is instantiated and the instructions of the content playback system are loaded for execution on the processor of the electronic system;
    an interactive navigation tool that is visually output onto the display screen of the electronic system as a play/pause button in the UI of the content playback system and is configured to respond to user interactions configured to control playback of the content stream by the content playback system, wherein the user interactions configured to control playback of the content stream comprise a drag interaction configured to scan content along a content timeline in a direction of the drag interaction and to scrub through the content stream as long as the drag interaction is engaged by the user interacting with the interactive navigation tool, wherein the content playback system is configured to play sequentially sampled content snippets while scrubbing through the content stream until the user releases the interactive navigation tool; and
    a skipped time UI element that is visually output onto the display screen of the electronic system and in the UI of the content playback system and is configured to display an amount of time being skipped in connection with a particular user interaction with the interactive navigation tool to skip through the content stream.

2. The versatile audio and video content playback navigation system of claim 1, wherein the user interactions configured to control playback of the content stream further comprise a tap interaction that is configured to start/pause content playback by the content playback system.

3. The versatile audio and video content playback navigation system of claim 1 further comprising audio speakers communicably connected to the electronic system and configured to output audible content of the content stream, wherein the content stream comprises one of an audio-only content stream and an audio/video content stream.

4. A versatile audio and video content playback navigation system comprising:
    an electronic system operable by a user and comprising a processor, a display screen, a content playback system, and a data storage unit that stores instructions of the content playback system that are configured to control playback of a content stream;
    a user interface (UI) of the content playback system that is visually output onto the display screen of the electronic system when the content playback system is instantiated and the instructions of the content playback system are loaded for execution on the processor of the electronic system;
    an interactive navigation tool that is visually output onto the display screen of the electronic system as a play/pause button in the UI of the content playback system and is configured to respond to user interactions configured to control playback of the content stream by the content playback system, wherein the user interactions configured to control playback of the content stream comprise a swipe interaction configured to skip content along a content timeline of the content stream in a direction of the swipe interaction and by an amount that is proportional to the swipe interaction; and
    a skipped time UI element that is visually output onto the display screen of the electronic system and in the UI of the content playback system and is configured to display an amount of time being skipped in connection with a particular swipe interaction with the interactive navigation tool to skip through the content stream.

5. The versatile audio and video content playback navigation system of claim 4, wherein the user interactions configured to control playback of the content stream further comprise a tap interaction configured to start/pause content playback by the content playback system and a drag interaction.

6. The versatile audio and video content playback navigation system of claim 5, wherein the drag interaction is configured to scan content along the content timeline in a direction of the drag interaction and to scrub through the content stream as long as the drag interaction is engaged by the user interacting with the interactive navigation tool.

7. The versatile audio and video content playback navigation system of claim 4 further comprising an audio speaker communicably connected to the electronic system and configured to output audible content of the content stream, wherein the content stream comprises one of an audio-only content stream and an audio/video content stream.

8. The versatile audio and video content playback navigation system of claim 4, wherein the amount of time being skipped is determined based on a comparison of a first position along the content timeline and a second position along the content timeline at which playback of the content stream continues after skipping.

9. The versatile audio and video content playback navigation system of claim 8, wherein skipping from the first position to the second position is based on a configurable amount of time in a particular direction.

10. The versatile audio and video content playback navigation system of claim 9, wherein the particular direction is forward.

11. The versatile audio and video content playback navigation system of claim 9, wherein the particular direction is backward.

12. A versatile audio and video content playback navigation system comprising:
- an electronic system operable by a user and comprising a processor, a display screen, a content playback system, and a data storage unit that stores instructions of the content playback system that are configured to control playback of a content stream;
- a user interface (UI) of the content playback system that is visually output onto the display screen of the electronic system when the content playback system is instantiated and the instructions of the content playback system are loaded for execution on the processor of the electronic system;
- an interactive navigation tool that is visually output onto the display screen of the electronic system as a play/pause button in the UI of the content playback system and is configured to respond to user interactions configured to control playback of the content stream by the content playback system, wherein the user interactions configured to control playback of the content stream comprise a swipe interaction configured to skip content along a content timeline of the content stream in a direction of the swipe interaction, wherein the swipe interaction comprises an artificial intelligence (AI)-based smart skip interaction that interprets a particular swipe interaction of a particular user according to machine learning process in which a model is trained and retrained on a plurality of swipe interactions performed by the particular user; and
- a skipped time UI element that is visually output onto the display screen of the electronic system and in the UI of the content playback system and is configured to display an amount of time being skipped in connection with the particular swipe interaction with the interactive navigation tool to skip through the content stream.

13. The versatile audio and video content playback navigation system of claim 12, wherein the user interactions configured to control playback of the content stream further comprise a tap interaction configured to start/pause content playback by the content playback system and a drag interaction.

14. The versatile audio and video content playback navigation system of claim 13, wherein the drag interaction is configured to scan content along the content timeline in a direction of the drag interaction and to scrub through the content stream as long as the drag interaction is engaged by the user interacting with the interactive navigation tool.

15. The versatile audio and video content playback navigation system of claim 12 further comprising an audio speaker communicably connected to the electronic system and configured to output audible content of the content stream, wherein the content stream comprises one of an audio-only content stream and an audio/video content stream.

16. The versatile audio and video content playback navigation system of claim 12, wherein data for each AI-based smart skip interaction by the particular user is added to the plurality of swipe interactions used by the machine learning process to retrain the model.

* * * * *